(12) United States Patent
Nakamura et al.

(10) Patent No.: US 12,030,628 B2
(45) Date of Patent: Jul. 9, 2024

(54) CRASH DETECTION DEVICE, FLYING BODY CRASH DETECTION METHOD, PARACHUTE OR PARAGLIDER DEPLOYMENT DEVICE, AND AIRBAG DEVICE

(71) Applicant: NIPPON KAYAKU KABUSHIKI KAISHA, Tokyo (JP)

(72) Inventors: Hiroshi Nakamura, Tokyo (JP); Yasuhiko Yagihashi, Tokyo (JP); Koichi Sasamoto, Tokyo (JP)

( * ) Notice: Subject to any disclaimer, the term of this patent is extended or adjusted under 35 U.S.C. 154(b) by 757 days.

(21) Appl. No.: 16/756,583

(22) PCT Filed: Oct. 11, 2018

(86) PCT No.: PCT/JP2018/038008
§ 371 (c)(1),
(2) Date: Apr. 16, 2020

(87) PCT Pub. No.: WO2019/078094
PCT Pub. Date: Apr. 25, 2019

(65) Prior Publication Data
US 2020/0239136 A1    Jul. 30, 2020

(30) Foreign Application Priority Data
Oct. 16, 2017  (JP) ................. 2017-200320

(51) Int. Cl.
*B64C 39/02*   (2023.01)
*B64D 17/54*   (2006.01)
(Continued)

(52) U.S. Cl.
CPC ............. *B64C 39/02* (2013.01); *B64D 17/54* (2013.01); *B64D 25/00* (2013.01);
(Continued)

(58) Field of Classification Search
CPC ............. B64C 39/02; B64C 2201/027; B64C 2201/185; B64C 39/024; B64D 17/54;
(Continued)

(56) References Cited

U.S. PATENT DOCUMENTS 6,685,140 B2 * 2/2004 Carroll ............... G05D 1/101
244/152
9,639,087 B1   5/2017 Cutler
(Continued)

FOREIGN PATENT DOCUMENTS

CN       105775142 A    7/2016
CN       106 885 381 A  5/2017
(Continued)

OTHER PUBLICATIONS

Machine Translation: JP-2012177568-A (Year: 2012).*
European Search Report; European Patent Office; Munich; dated Jun. 2, 2021.
ISR; Japan Patent Office; Tokyo; dated Nov. 27, 2018.

*Primary Examiner* — Anne Marie Antonucci
*Assistant Examiner* — Connor L Knight
(74) *Attorney, Agent, or Firm* — Patshegen IP; Moshe Pinchas

(57) ABSTRACT

A crash detection device for mounting on a flying object having a parachute or paraglider deployment device. The crash detection device includes a sensor for measuring a parameter related to a flying state of the flying object. The sensor is configured for acquiring data of the parameter in a normal mode in which the data is acquired at a sampling frequency of less than 1 kHz, and in an abnormal mode in which the data is acquired at the sampling frequency of 1 kHz or more. The crash detection device further includes a detector coupled to the sensor and configured for verifying proper operation of the sensor; and a controller configured for receiving from the sensor values of the parameter and for determining flying state of the flying object.

5 Claims, 8 Drawing Sheets

(51) Int. Cl.
   *B64D 25/00* (2006.01)
   *G05B 23/02* (2006.01)
   *G05D 1/00* (2006.01)
   *B64U 10/13* (2023.01)

(52) U.S. Cl.
   CPC ....... *G05B 23/0205* (2013.01); *G05D 1/0055* (2013.01); *G05D 1/0066* (2013.01); *B64U 10/13* (2023.01)

(58) Field of Classification Search
   CPC ........ B64D 25/00; B64D 17/80; B64D 45/06; B64D 2201/00; G05B 23/0205; G05D 1/0055; G05D 1/0066
   See application file for complete search history.

(56) References Cited

U.S. PATENT DOCUMENTS

| | | | |
|---|---|---|---|
| 2010/0261980 A1* | 10/2010 | Peng | G08B 21/0453 600/301 |
| 2016/0207552 A1* | 7/2016 | Mian | B61L 15/0072 |
| 2016/0232794 A1* | 8/2016 | Hafeez | G01C 21/20 |
| 2017/0106986 A1* | 4/2017 | Sweeny | B64D 17/70 |
| 2017/0152051 A1* | 6/2017 | Sugaya | B64C 39/024 |
| 2020/0193729 A1* | 6/2020 | Nilsson | G08B 13/1965 |

FOREIGN PATENT DOCUMENTS

| | | | |
|---|---|---|---|
| JP | 2012177568 A | * | 9/2012 |
| JP | 2017-95010 A | | 6/2017 |
| WO | 2017161563 A1 | | 9/2017 |
| WO | 2017164666 A1 | | 9/2017 |

\* cited by examiner

CRASH DETECTION DEVICE, FLYING BODY CRASH DETECTION METHOD, PARACHUTE OR PARAGLIDER DEPLOYMENT DEVICE, AND AIRBAG DEVICE

TECHNICAL FIELD

The present invention relates to a crash detection device mounted on a flying object, a method of detecting a crash of a flying object, a parachute or paraglider deployment device, and an airbag device.

BACKGROUND ART

In recent years, with the development of an autonomous control technology and a flight control technology, an industrial use of a flying object provided with a plurality of rotor blades called a drone, for example, is accelerating. The drone flies, for example, by simultaneously rotating a plurality of rotor blades in a well-balanced manner, ascends and descends by increasing or decreasing a rotation speed of the rotor blades, and can advance and retreat by tilting an airframe by increasing or decreasing the rotation speed of the rotor blades. Such flying objects are expected to spread worldwide in the future.

Meanwhile, the risk of fall accidents of the flying objects as described above is considered to be dangerous and hinders spread of the flying objects. In order to reduce the risk of such fall accidents, parachute deployment devices, airbag devices, and the like have been commercialized as safety devices. For example, Patent Literature 1 discloses an autonomous parachute-opening device for a flying object that detects that the flying object is at a predetermined altitude or higher, and then compares a flying posture parameter and a battery capacity parameter with predetermined values, and when an abnormality is detected, stops power supply to the flying object and automatically opens a parachute.

CITATION LIST

Patent Literature

Patent Literature 1: CN 105775142 A

SUMMARY OF INVENTION

Technical Problems

However, in the known arts including the above Patent Literature, there is room for further improving the speed and reliability of the abnormality detection of flying objects. Specifically, the known arts do not consider the speed and reliability of data collection for detecting an abnormality of the flying object, and cannot prevent a malfunction in an effort to improve the accuracy of detecting an abnormality of the flying object.

It is therefore an object of the present invention to provide a crash detection device, a method of detecting a crash of a flying object, a parachute or paraglider deployment device, and an airbag device that can improve the reliability of the flying object in terms of safety.

Solutions to Problems (1) The present invention is a crash detection device that can be mounted on a flying object and that can detect a crash of the flying object, the crash detection device including a detection part that can detect a flying state of the flying object, a calculation section that can determine whether the flying state of the flying object is abnormal based on data on the flying state of the flying object acquired by the detection part, and an abnormal signal output section capable of outputting an abnormal signal to the outside when the calculation section determines that the flying state of the flying object is abnormal, in which the calculation section acquires the data from the detection part at a sampling frequency of 1 kHz or more, determines whether the data is data indicating that the flying state of the flying object is abnormal or noise that is unnecessary data (hereinafter, a signal or noise determination), and determines that the flying state of the flying object is abnormal when the data is determined to be the data indicating that the flying state of the flying object is abnormal. Note that the calculation section may output the abnormal signal to the outside when determining that the flying state of the flying object is abnormal.

According to the configuration of the above (1), since the sampling frequency is larger than that of the known arts, the data indicating that the flying state of the flying object is abnormal (signal) and the noise that is unnecessary data can be easily distinguished even when noise is mixed in the data actually measured by the detection part. It is therefore possible to accurately detect whether the flying state of the flying object is abnormal. Further, with no worries about noise such as electrical noise or mechanical noise, there is no need to attach an electromagnetic wave shielding member to the crash detection device or perform an electromagnetic wave shielding treatment or the like on an existing member as in the known arts, thereby reducing the weight and the cost.

(2) In the crash detection device of the above (1), preferably, the calculation section includes an abnormal mode in which the data is acquired from the detection part at the sampling frequency of 1 kHz or more, and a normal mode in which the data is acquired from the detection part at a sampling frequency of less than 1 kHz at a normal time when there is no abnormality, and the calculation section is in the normal mode in an initial state, and the calculation section switches from the normal mode to the abnormal mode and acquires the data from the detection part when the data acquired from the detection part is equal to or greater than a predetermined threshold value in the normal mode.

According to the configuration of the above (2), with a configuration that the normal mode is used at the normal time and the abnormal mode is used at a time of emergency, a useless data collection can be suppressed as compared with the case of the configuration of the above (1) (only data to be examined can be picked up and collected). Thus, power consumption can be saved as compared with the configuration of the above (1).

(3) In the crash detection device according to (1) or (2), the calculation section preferably performs the signal or noise determination based on information on a half width or a peak area of a peak of the data acquired by calculating the data acquired from the detection part.

According to the configuration of the above (3), the calculation section calculates the half width or the peak area of the signal and noise peaks and uses the calculated half width or peak area. Thus, the data actually measured and acquired by the detection part can be subjected to the signal or noise determination more accurately than in the known arts.

(4) As another aspect, the present invention is a method of detecting a crash of a flying object including a safety device, the method may include a data acquisition step of acquiring a data of a flying state of the flying object at a sampling frequency of 1 kHz or more, a first determination step of determining whether the data acquired in the data acquisition step is equal to or greater than a predetermined threshold value, a second determination step of determining whether the data is data indicating that a flying state of the flying object is abnormal or noise that is unnecessary data when the data is determined to be equal to or greater than the predetermined threshold value by the first determination step, and a step of activating the safety device by the second determination step when the data is determined to be the data indicating that the flying state of the flying object is abnormal.

According to the configuration of the above (4), effects similar to the above (1) can be acquired.

(5) As another aspect, the parachute or paraglider deployment device of the present invention includes the crash detection device according to any one of the above (1) to (3), a parachute or a paraglider that is deployable, and an ejection device that, when an abnormal signal is output by the crash detection device, receives the abnormal signal and ejects the parachute or the paraglider.

According to the configuration of the above (5), even when noise is mixed in the actually measured data, it is possible to guarantee the operation of the parachute or paraglider deployment device and prevent a malfunction of the deployment device since the crash detection device that can easily distinguish between the signal and the noise is provided. This can improve the reliability of the parachute or paraglider deployment device in terms of safety.

(6) As still another aspect, the airbag device of the present invention includes an airbag that is inflatable, a crash detection device according to any one of (1) to (3), and a gas generator that, when an abnormal signal is output by the crash detection device, receives the abnormal signal and supplies gas into the airbag.

According to the configuration of the above (6), even when noise is mixed in the actually measured data, it is possible to guarantee the operation of the airbag device and prevent a malfunction of the airbag device since the crash detection device that can easily distinguish between the signal and the noise is provided. This can improve the reliability of the airbag device in terms of safety.

Advantageous Effects of Invention

According to the present invention, it is possible to provide a crash detection device, a method of detecting a crash of a flying object, a parachute or paraglider deployment device, and an airbag device that can improve the reliability of the flying object in terms of safety.

DESCRIPTION OF EMBODIMENT

Hereinafter, a flying object to which a parachute or paraglider deployment device according to one embodiment of the present invention is applied will be described with reference to the drawings.

Figure 1:
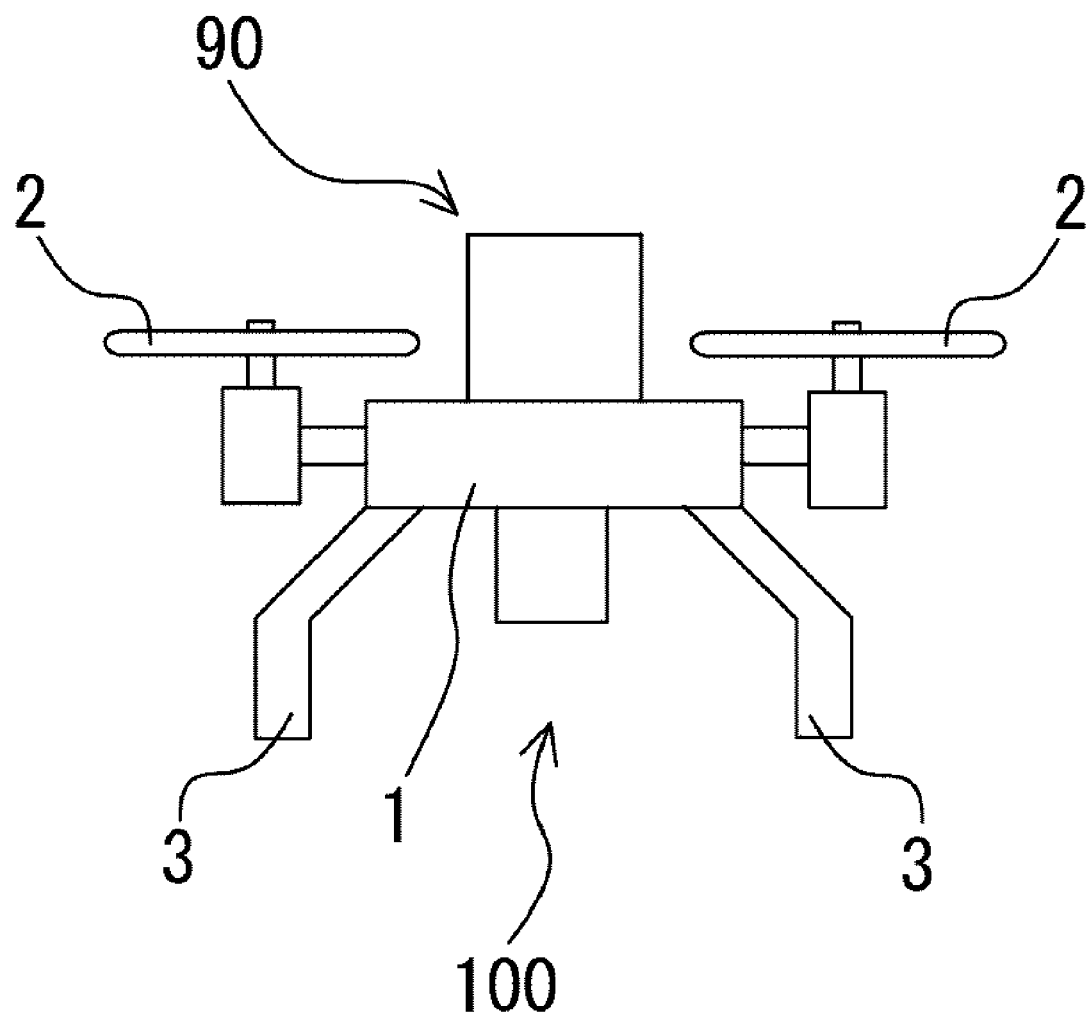
FIG. 1 is a view showing an example of a flying object to which a parachute or paraglider deployment device according to one embodiment of the present invention is applied.

FIG. 1 is a diagram showing an example of a flying object to which a parachute or paraglider deployment device 90 is applied. As shown in FIG. 1, a flying object 100 includes an airframe 1, one or more propulsion mechanisms (for example, propellers) 2 that are coupled to the airframe 1 and propel the airframe 1, a plurality of legs 3 provided below the airframe 1, and the parachute or paraglider deployment device 90. The parachute or paraglider deployment device 90 is provided on the airframe 1.

Figure 2:
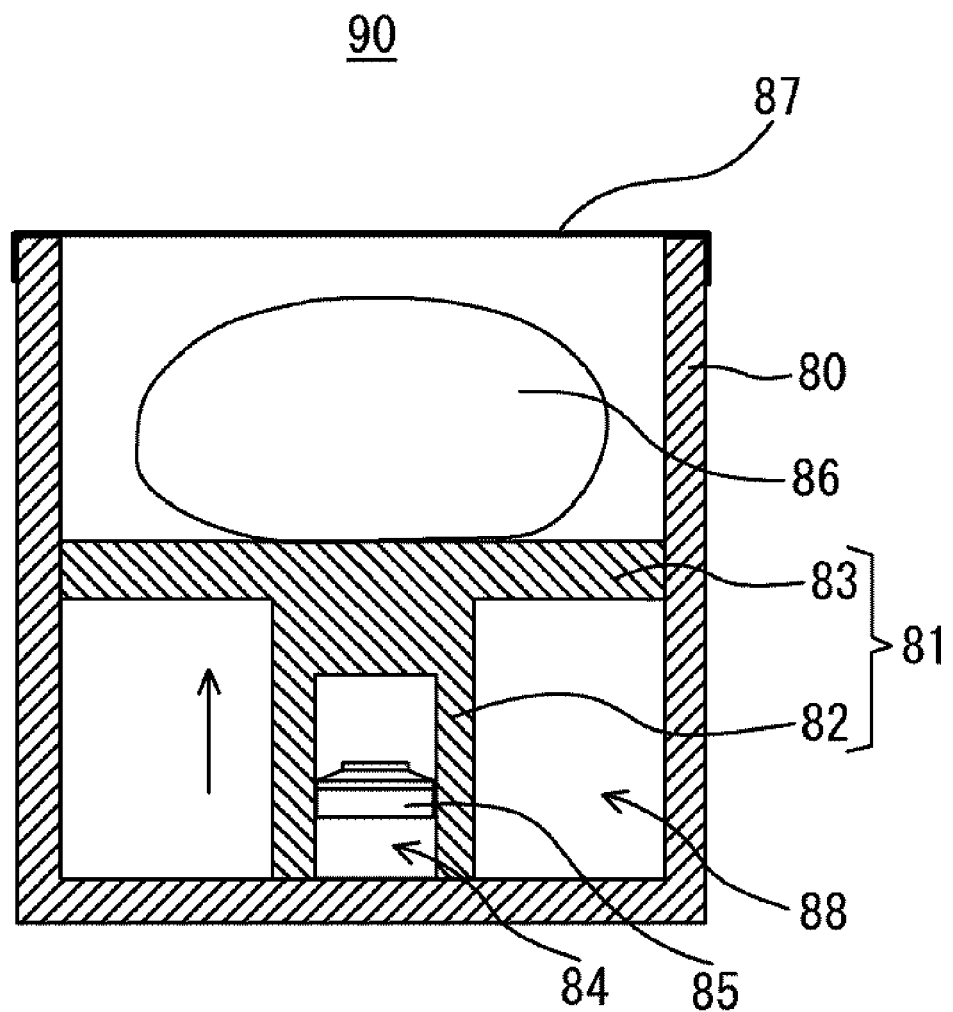
FIG. 2 is a cross-sectional view showing a parachute or paraglider deployment device according to one embodiment of the present invention.

In FIG. 2 showing an example of the parachute or paraglider deployment device 90, a deployment device that deploys a parachute will be described as an example.

As shown in FIG. 2, the parachute or paraglider deployment device 90 includes an actuator 88 and a parachute or paraglider 86. The actuator 88 includes an igniter 84 having a cup-shaped case 85 that houses an ignition charge (not shown), a piston 81 having a recess 82 and a piston head 83 formed integrally with the recess 82, and a bottomed cylindrical housing 80 that houses the piston 81 and regulates a propulsion direction of the piston 81. The parachute or paraglider 86 is housed in the housing 80 while being disposed on the piston head 83, and is a so-called parachute. In such a configuration, the parachute or paraglider 86 can be directly pushed out and deployed by the propulsion of the piston 81. An opening end of the housing 80 is closed by a lid 87 in an initial state, and the lid 87 is detached from the opening end by pushing out the parachute or paraglider 86.

Further, the parachute or paraglider deployment device 90 includes a crash detection device 40 (not shown in FIG. 2) including an acceleration sensor or the like that detects an abnormality of the flying object.

In such a configuration, when an abnormality is detected by the crash detection device 40, the piston 81 is propelled by a gas pressure generated in response to an ignition operation of the igniter 84. Accordingly, the parachute or paraglider 86 can be directly pushed out and deployed by a propulsive force of the piston 81.

Figure 3:
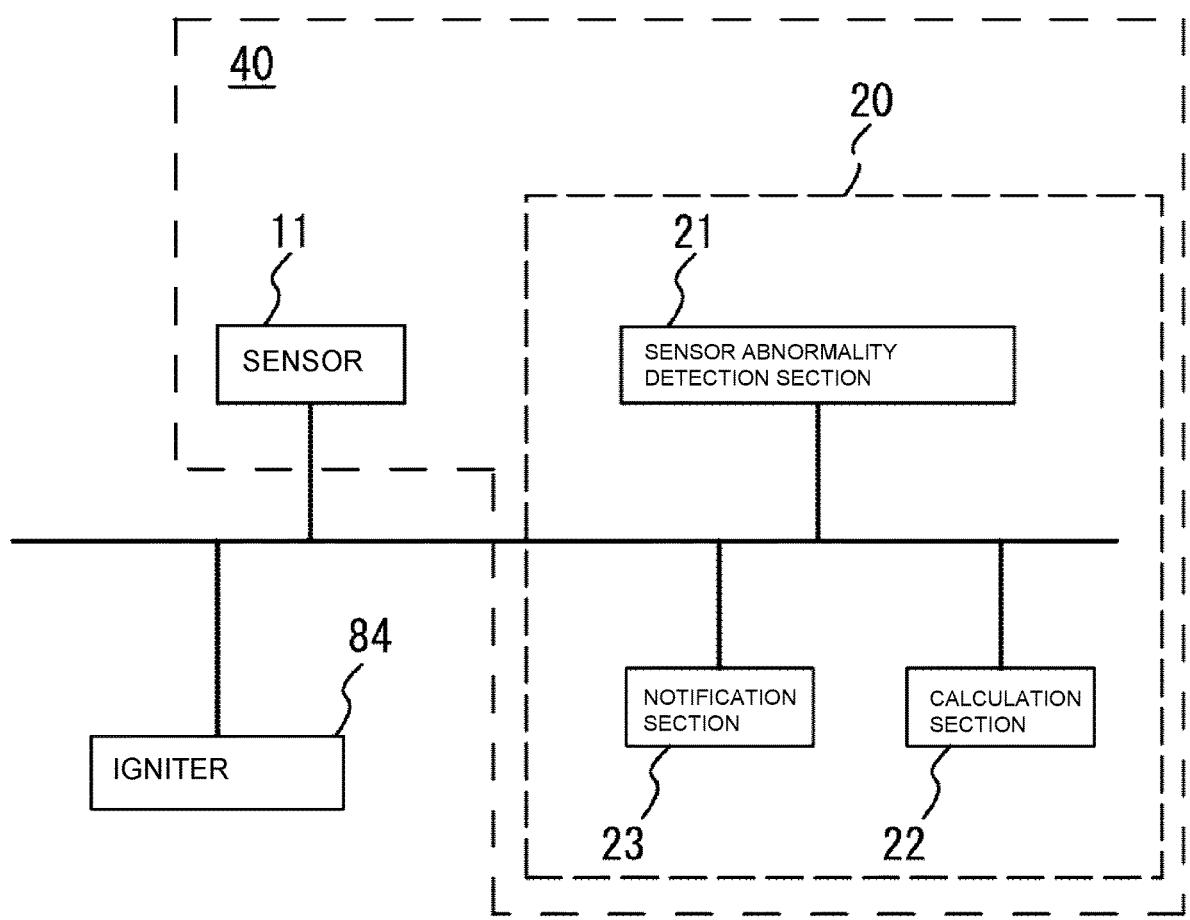
FIG. 3 is a block diagram showing a functional configuration of a crash detection device provided in the deployment device of FIG. 2.

Here, a functional configuration of the crash detection device 40 will be described. As shown in FIG. 3, the crash detection device 40 includes a sensor (detection part) 11 and a controller (computer having a CPU, a ROM, a RAM, and the like) 20, and is electrically connected to the igniter 84 of the deployment device 90.

The sensor 11 detects a flying state (including a collision, a crash, and the like) of the flying object 100. Specifically, the sensor 11 is, for example, a sensor selected from at least one of an acceleration sensor, a gyro sensor, a barometric pressure sensor, a laser sensor, an ultrasonic sensor, and the like. The sensor 11 can acquire data on the flying state of the flying object 100 such as a speed, acceleration, inclination, altitude, and a position of the flying object 100.

The controller 20 includes a sensor abnormality detection section 21, a calculation section 22, and a notification section 23 as a functional configuration. The sensor abnormality detection section 21, the calculation section 22, and the notification section 23 are functionally achieved by the controller 20 executing a predetermined program.

The sensor abnormality detection section 21 detects an abnormal state of the sensor 11. That is, the sensor abnormality detection section 21 detects whether the sensor 11 can operate normally.

The calculation section 22 determines whether the flying state of the flying object is abnormal, and specifically, whether the flying object 100 has been impacted (or whether the flying object 100 has collided), based on the data actually measured and acquired by the sensor 11. The data collection interval (sampling frequency) of the calculation section 22 can be set to, for example, any value of 1 kHz or more (preferably any value of 1 kHz to 10 kHz inclusive), and is set to 10 kHz in this embodiment. When the calculation section 22 determines that the flying state of the flying object is abnormal, the calculation section 22 outputs an abnormal signal (which may include a command signal for activating or operating another device) to the outside. An abnormal signal output section may be provided separately from the calculation section 22, and the abnormal signal output section may output the abnormal signal in response to the command from the calculation section 22.

Figure 4A:
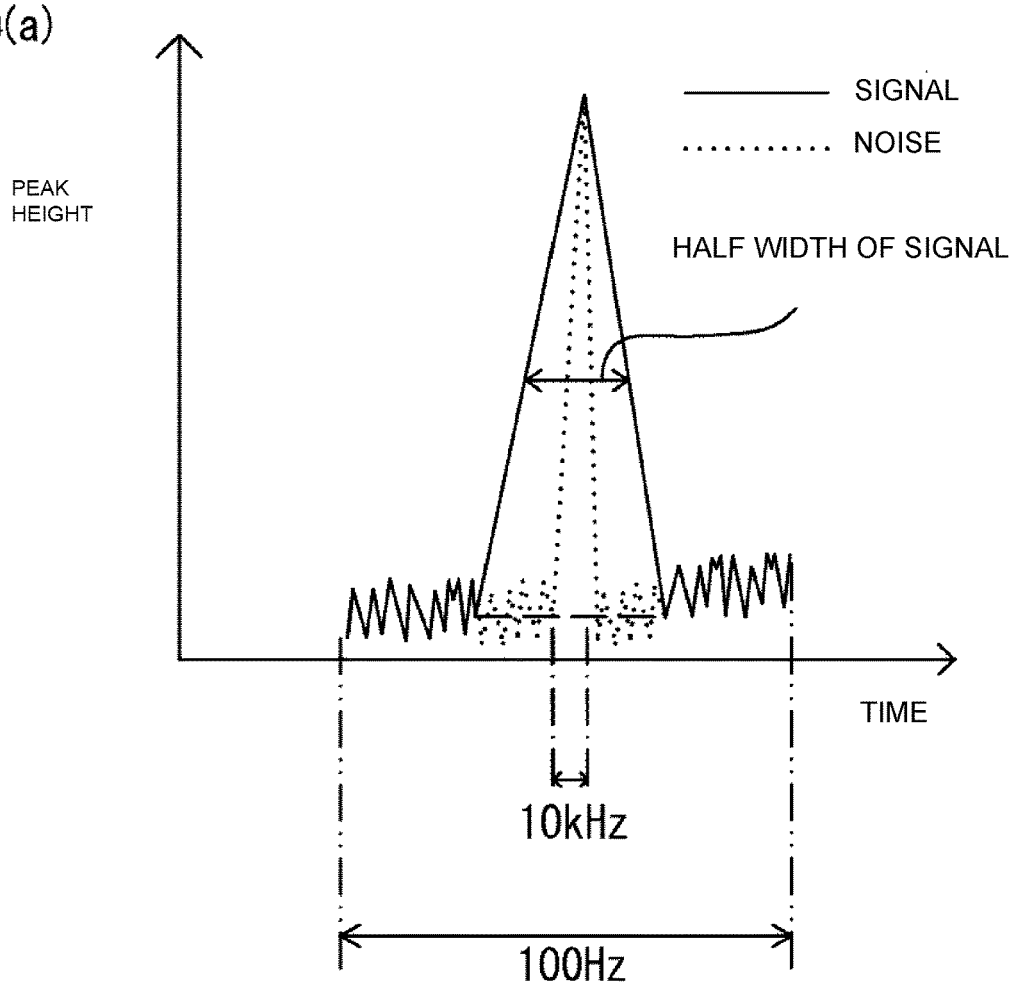
FIG. 4($a$) is a graph showing an example of a signal and noise, and FIG. 4($b$) is a graph for explaining a peak area.
Figure 4B:
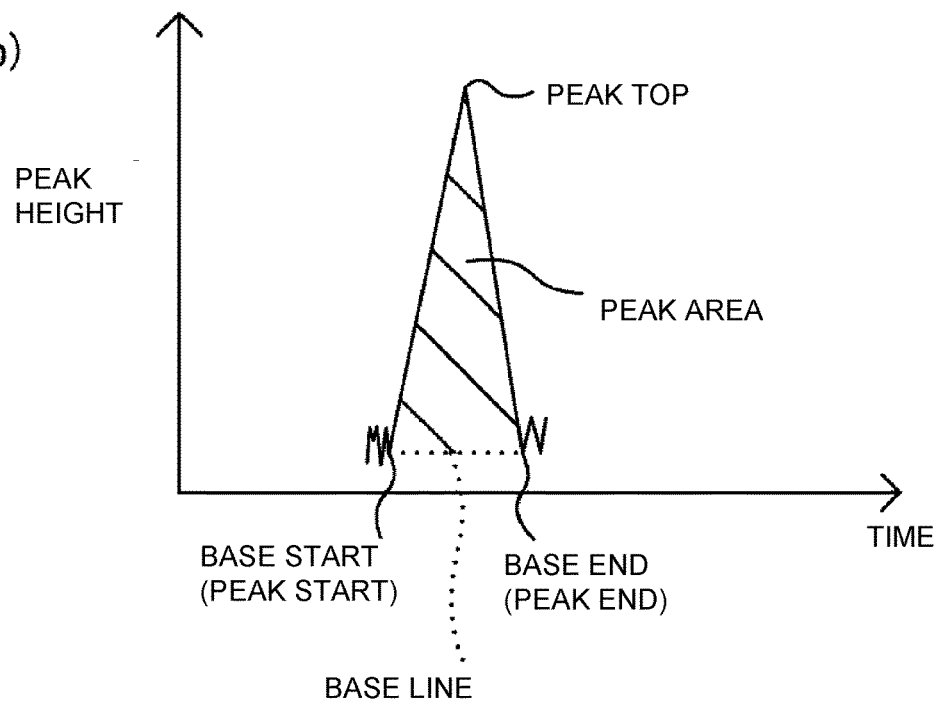

Here, the data detected upon detection of the impact is defined as a signal, and the unnecessary data generated as electrical noise or mechanical noise is defined as noise. FIG. 4(*a*) shows an example of the signal and the noise. The signal has a half width wider than the noise. Using these characteristics, the calculation section 22 can calculate the half width or a peak area of the signal and noise peaks shown in FIG. 4 by setting the sampling frequency to 10 kHz and taking in the data. Then, the calculation section 22 can determine whether the data is the signal or the noise based on information on the half width or the peak area of the signal and noise peaks (signal or noise determination). The peak area is an area of a part surrounded by a straight line (base line) parallel to a time axis connecting a start point (base start) and an end point (base end) and a target data waveform (having a peak start, a peak top, and a peak end), as indicated by the shaded area shown in FIG. 4(*b*). Further, when determining that the data is the signal, the calculation section 22 determines that the flying object 100 has been impacted and outputs a deployment device activation signal to the parachute or paraglider deployment device 90.

When the sensor abnormality detection section 21 detects the abnormality of the sensor 11, the notification section 23 notifies an administrator or the like that the abnormality has been detected.

Subsequently, a flow of an operation of the crash detection device 40 of this embodiment will be described using a flowchart.

Figure 5:
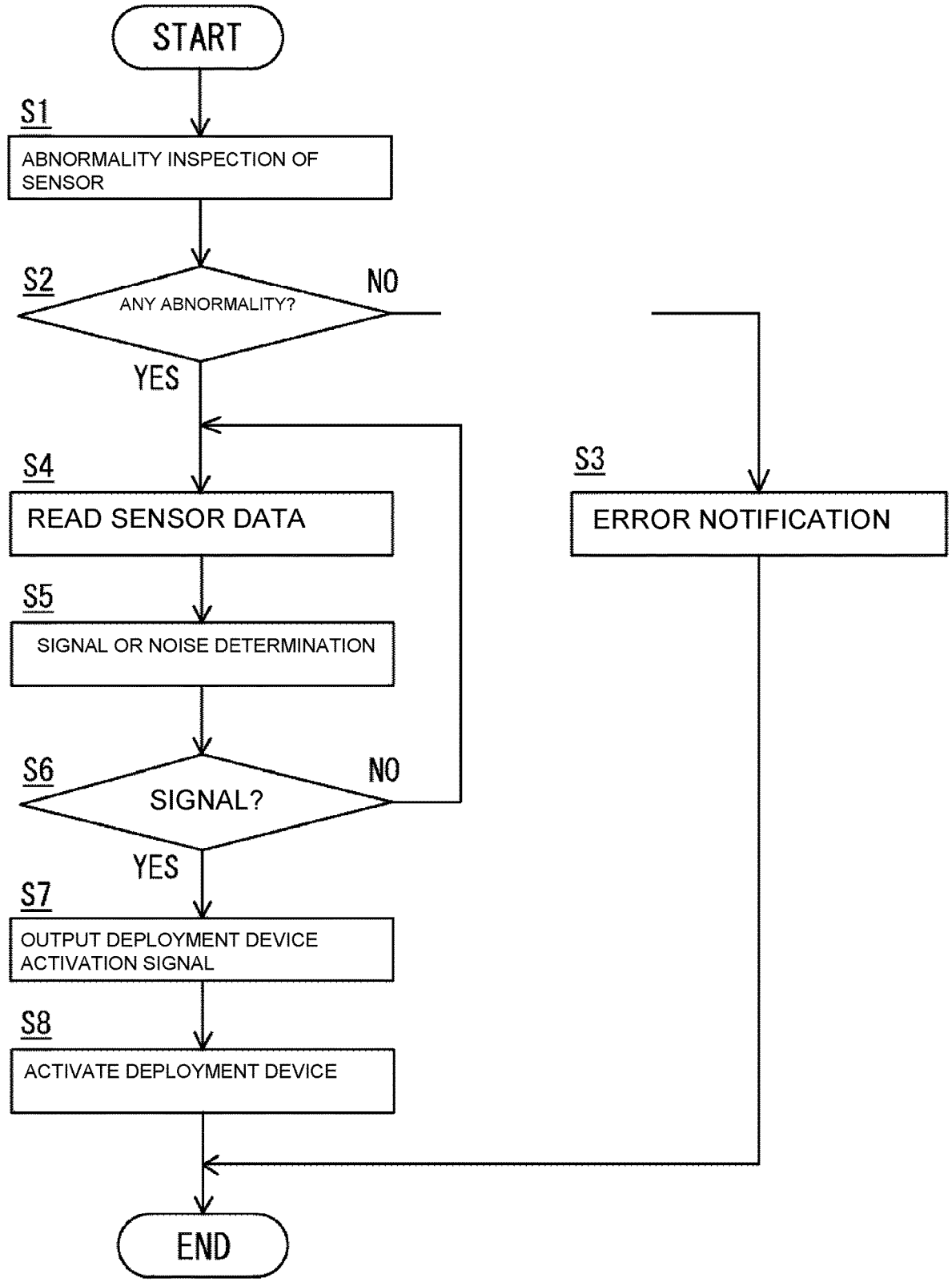
FIG. 5 is a flowchart showing an example of an operation of the crash detection device.

As shown in FIG. 5, first, an abnormality inspection of the sensor 11 is performed by the sensor abnormality detection section 21 (Step S1). Specifically, the sensor abnormality detection section 21 inspects whether an acceleration sensor or the like that measures the acceleration of the flying object operates normally.

When it is not determined that there is no abnormality as a result of step S1 (NO in step S2), the sensor abnormality detection section 21 notifies the administrator or the like of an error (step S3) and ends. On the other hand, when it is determined that there is no abnormality as a result of step S1 (YES in step S2), the calculation section 22 reads the data actually measured by the sensor 11 (step S4).

After step S4, the calculation section 22 determines whether the data actually measured and acquired by the sensor 11 is a signal or noise (step S5). When the acquired data is not a signal (NO in step S6), the calculation section 22 returns to the processing in step S4.

On the other hand, when the acquired data is a signal (YES in step S6), the calculation section 22 outputs a deployment device activation signal (abnormal signal) to the parachute or paraglider deployment device 90 (step S7). Note that, as one modification, when the acquired data is a signal, and furthermore, when a peak height (peak top) of the signal is equal to or greater than a predetermined threshold value, the calculation section 22 may output the deployment device activation signal to the parachute or paraglider deployment device 90.

Then, the parachute or paraglider deployment device 90 that has received the deployment device activation signal is activated, deploys the parachute or paraglider (step S8), and ends.

As described above, according to this embodiment, it is possible to guarantee the operation of the deployment device 90 and prevent a malfunction of the deployment device 90 even when noise is mixed in the actually measured data since the crash detection device 40 that can easily distinguish between the signal and the noise with the sampling frequency larger than that of the known arts is provided. This can improve the reliability of the parachute or paraglider deployment device 90 in terms of safety. Further, with no worries about noise, there is no need to attach an electromagnetic wave shielding member or perform an electromagnetic wave shielding treatment or the like on an existing member as in the known arts, thereby reducing the weight and the cost.

Further, according to this embodiment, the calculation section 22 calculates and the half width or the peak area of the signal and noise peaks and uses the calculated half width or peak area. Thus, the data actually measured and acquired by the sensor 11 can be subjected to the signal or nose determination more accurately than in the known arts.

Further, according to this embodiment, since an operation state of the sensor 11 is detected by the sensor abnormality detection section 21, it can be determined whether the sensor 11 can operate normally. The operation of the sensor 11 is thus guaranteed. This can prevent the deployment device 90 from being activated without confirming whether the sensor 11 is operable. Further, the calculation section 22 can improve the reliability of the deployment device 90 in terms of safety.

Further, according to this embodiment, when an abnormality of the sensor 11 is detected by the sensor abnormality detection section 21, the notification section 23 notifies the administrator or the like of the detection of the abnormality. This allows the administrator or the like to easily and quickly recognize the abnormality.

Figure 6:
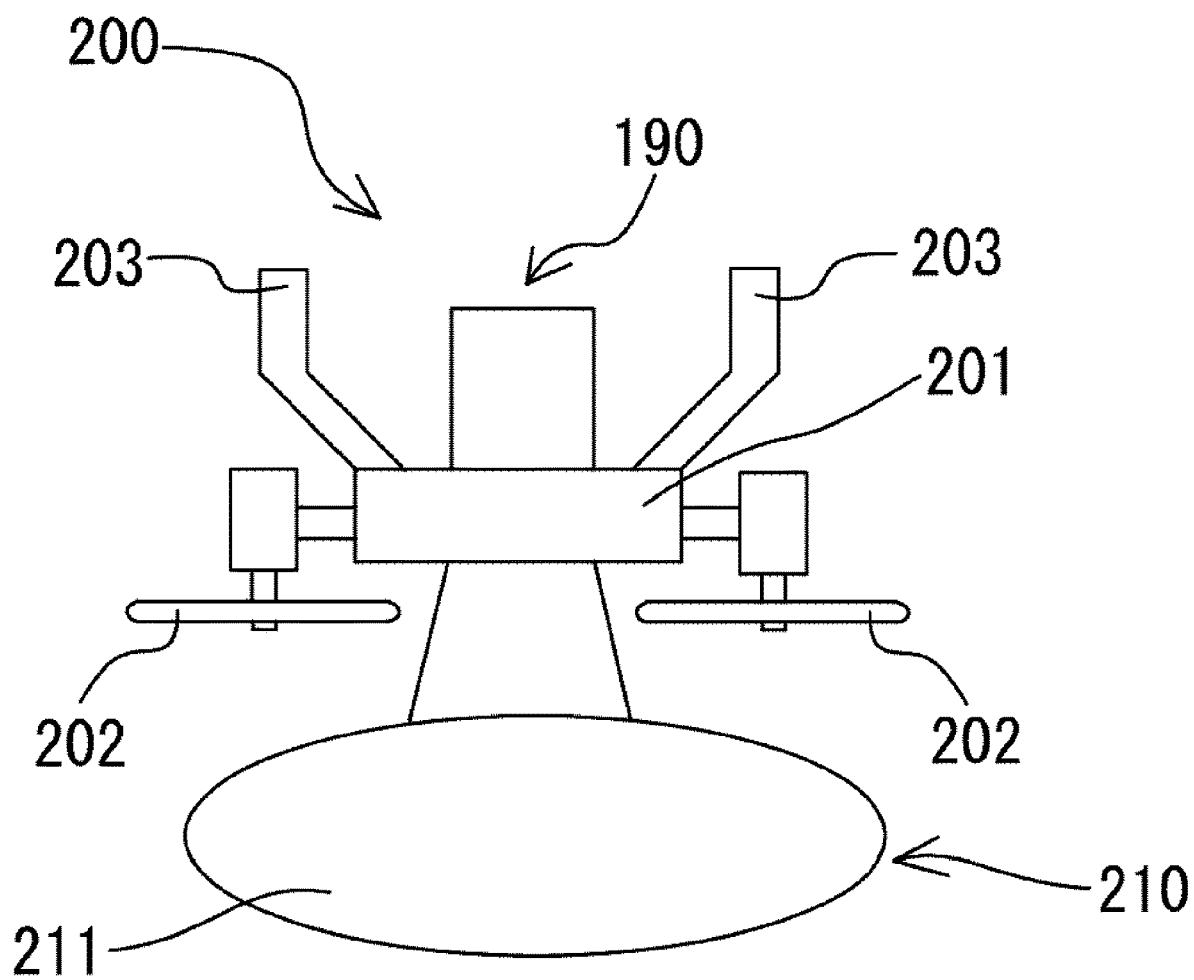
FIG. 6 is a diagram showing an example of a flying object provided with an airbag device to which the crash detection device is applied.

Next, flying objects 200 and 300 including the airbag device to which the crash detection device of the above embodiment is applied will be described. In FIG. 6, which will be described later, parts denoted by the reference signs having the same last two digits as those in FIG. 1 are similar to those described with reference to FIG. 1 unless otherwise indicated, and a description thereof will be omitted. Similarly, in FIG. 7, which will be described later, parts denoted by the reference signs having the same last two digits as those in FIGS. 1 and 6 are similar to parts described in FIG. 1 and FIG. 6 unless otherwise indicated, and a description thereof will be omitted. In the airbag device used herein, the airbag is inflated by a gas pressure generated by a gas generator including the igniter. Note that the gas generator may be of any type as long as it can supply gas into the airbag, and may be, for example, a cylinder type.

As shown in FIG. 6, the flying object 200 includes an airbag device 210 that inflates an airbag 211 by the gas pressure generated in response to an ignition operation of an igniter similar to the igniter 84 described above. The airbag device 210 is provided on an airframe 201 opposite from a parachute or paraglider deployment device 190 provided below the airframe 201 in a normal posture.

In such a configuration, when the data actually measured and acquired by the sensor (not shown) is determined to be a signal by the crash detection device (not shown) mounted on the airbag device 210, as in the case of the crash detection device 40 described above, the crash detection device transmits the deployment device activation signal to the igniter to operate the igniter. Note that, when the crash detection device mounted on the airbag device 210 determines that the data actually measured and acquired by the sensor (not shown) is noise, the crash detection device does not transmit the deployment device activation signal to the igniter.

An airbag 311 is inflated by the gas pressure generated by the operation of the igniter. This can protect obstacles, loads, and especially pedestrians, at the time of a fall.

Figure 7:
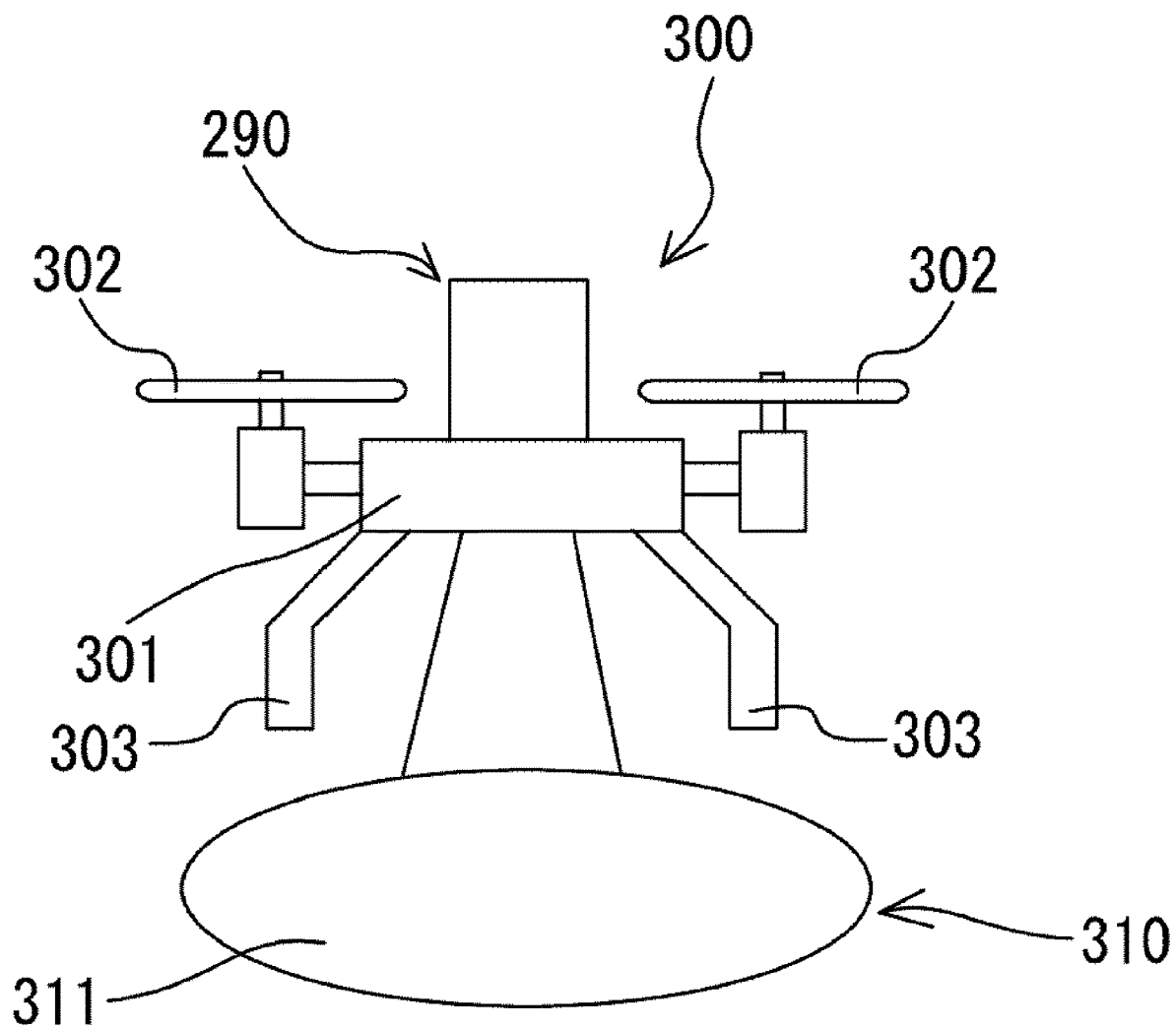
FIG. 7 is a diagram showing another example of a flying object provided with an airbag device to which the crash detection device is applied.

Further, as shown in FIG. 7, in the flying object 300, an airbag device 310 may be provided on an airframe 301 opposite from a parachute or paraglider deployment device 290 provided above the airframe 301 in the normal posture. The flying object 300 is provided with a device (not shown) below the airframe 301 in the normal posture.

In such a configuration, when the data actually measured and acquired by the sensor (not shown) is determined to be a signal by the crash detection device (not shown) mounted on the airbag device 310, as in the case of the crash detection device 40 described above, the crash detection device transmits the deployment device activation signal to the igniter to operate the igniter. Note that, when the crash detection device mounted on the airbag device 310 determines that the data actually measured and acquired by the sensor (not shown) is noise, the crash detection device does not transmit the deployment device activation signal to the igniter.

Further, when the airbag 311 is inflated by the airbag device 310 when the flying object 300 falls, pedestrians, obstacles, and especially the device of the flying object 300 can be protected.

As described above, since the airbag devices 210 and 310 include the crash detection device (not shown), a malfunction of the airbag devices 210 and 310 can be prevented. This can improve the reliability of the airbag devices 210 and 310 in terms of safety. Other advantages are similar to those in the case of the parachute or paraglider deployment device 90 described above.

As described above, the embodiment of the present invention has been described with reference to the drawings. However, the specific configuration of the present invention shall not be interpreted as to be limited to the above described embodiment. The scope of the present invention is defined not by the above embodiment but by claims set forth below, and shall encompass the equivalents in the meaning of the claims and every modification within the scope of the claims.

In the above-described embodiment, the sensor abnormality detection section 21, the calculation section 22, and the notification section 23 are functionally achieved by software. However, the present invention is not limited thereto, but may be configured by hardware.

In the above-described embodiment, the sampling frequency of the calculation section 22 is set to a single value of 10 kHz for reading the data actually measured and acquired by the sensor. Alternatively, the calculation section may be configured to properly use the normal mode (sampling frequency is set to any value of less than 1 kHz (preferably 100 Hz or less)) and the abnormal mode (sampling frequency is set to any value of 1 kHz or more (preferably from 1 kHz to 10 kHz inclusive)). Hereinafter, a specific example of this configuration will be described. Note that parts using the part names similar to those in the above-described embodiment are similar unless otherwise specified, and thus a description may be omitted. Further, components that are not particularly described are similar to those in the above-described embodiment, and thus a description thereof may be omitted.

The calculation section in the crash detection device of this modification uses the normal mode at a normal time, and switches from the normal mode to the abnormal mode when the sensor detects that a certain impact or the like has been received, and then performs a signal or noise determination similar to the determination in the above embodiment.

Subsequently, a flow of the operation of the crash detection device of this modification will be described using a flowchart. Note that the calculation section in the crash detection device of this modification is in the normal mode in the initial state.

Figure 8:
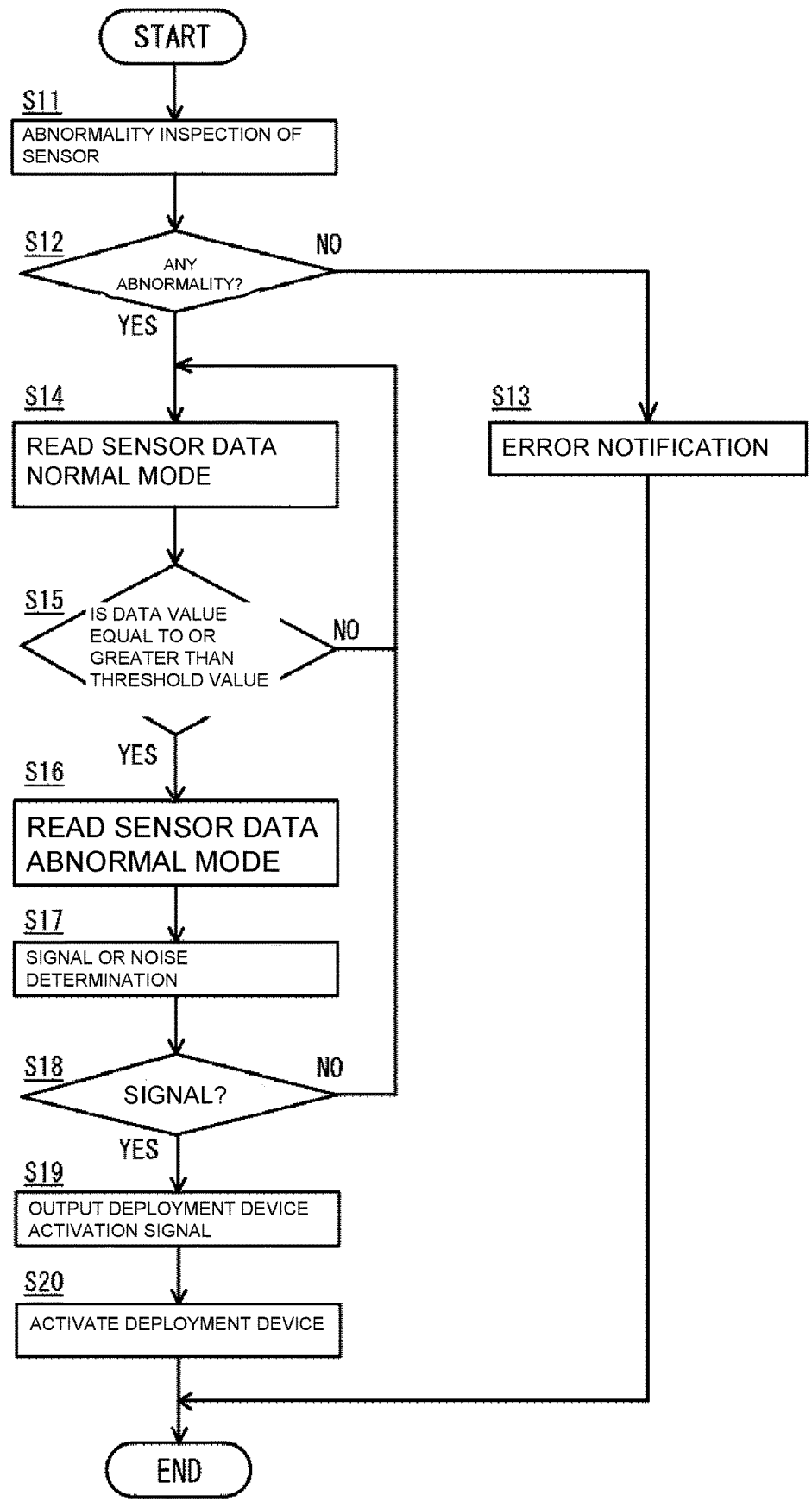
FIG. 8 is a flowchart showing another example of the operation of the crash detection device.

As shown in FIG. 8, first, the abnormality inspection of the sensor is performed by the sensor abnormality detection section (Step S11). Specifically, the sensor abnormality detection section inspects whether an acceleration sensor or the like that measures the acceleration of the flying object operates normally.

When it is not determined that there is no abnormality as a result of step S11 (NO in step S12), the sensor abnormality detection section notifies the administrator or the like of an error (step S13) and ends. On the other hand, when it is determined that there is no abnormality as a result of step S11 (YES in step S12), the calculation section reads the data actually measured by the sensor (step S14) in the normal mode (here, for example, the sampling frequency is set to 100 Hz).

After step S14, it is determined whether a value of the actually measured data (peak height (peak top)) is equal to or greater than a predetermined threshold value (step S15). When the value of the acquired data is not equal to or greater than the predetermined threshold value (NO in step S15), the calculation section 22 returns to the processing in step S14.

On the other hand, when the value of the acquired data is equal to or greater than the predetermined threshold value (YES in step S15), the calculation section switches from the normal mode to the abnormal mode (here, for example, the sampling frequency is set to 1 kHz), and then, reads the data actually measured by the sensor (step S16).

After step S16, the calculation section determines whether the data actually measured and acquired by the sensor is a signal or noise (step S17). When the acquired data is not a signal (NO in step S18), the calculation section returns to the processing in step S14.

On the other hand, when the acquired data is a signal (YES in step S18), the calculation section outputs the deployment device activation signal (abnormal signal) to the parachute or paraglider deployment device (step S19). Note that, as a modification, when the acquired data is a signal, and furthermore, when the peak height (peak top) of the signal is equal to or greater than another predetermined threshold value, the calculation section 22 may output the deployment device activation signal to the parachute or paraglider deployment device 90.

Then, the parachute or paraglider deployment device that has received the deployment device activation signal is activated, deploys the parachute or paraglider (step S20), and ends.

Accordingly, the operational advantages similar to those of the parachute or paraglider deployment device 90 of the above embodiment can be acquired. Further, in the calculation section of this modification, with a configuration that the normal mode is used at the normal time and the abnormal mode is used at a time of emergency, a useless data collection can be suppressed as compared with the case of the above embodiment (only data highly required to be examined can be picked up and collected). Thus, power consumption can be saved as compared with the above embodiment.

REFERENCE SIGNS LIST

1, 201, 301 Airframe
2, 202, 302 Propulsion mechanism
3, 203, 303 Leg
20 Controller
21 Sensor abnormality detection section
22 Calculation section
23 Notification section
80 Housing
81 Piston
82 Recess
83 Piston head
84 Igniter
85 Case
86 Parachute or paraglider
87 Lid
88 Actuator
90, 190, 290 Parachute or paraglider deployment device
100, 200, 300 Flying object
210, 310 Airbag device
211, 311 Airbag

The invention claimed is:

1. A crash detection device for mounting on a flying object having a parachute or paraglider deployment device, the crash detection device comprising:
a sensor configured for measuring a parameter related to a flying state of the flying object, said sensor is configured for acquiring data of said parameter in a normal mode in which the data is acquired at a sampling frequency of less than 1 kHz, and in an abnormal mode in which the data is acquired at the sampling frequency of 1 kHz or more;
a detector coupled to said sensor and configured for verifying proper operation of said sensor; and
a controller configured for receiving from said sensor values of said parameter and for determining flying state of the flying object;
wherein said controller is configured to selectively shift from said normal mode to said abnormal mode when data of said parameter is above a predetermined threshold value and said proper operation of said sensor is verified by said detector;
wherein said controller is further configured to determine an abnormal flying state in accordance with data obtained from said sensor in said abnormal mode and to output an activation signal for actuating the deployment device in response to said abnormal flying state; and
wherein the controller is configured to distinguish noise based on information on a half width or a peak area of a peak of the data acquired by calculating the data acquired from the sensor.

2. The crash detection device according to claim 1, wherein in an initial state said sensor is configured for acquiring data of said parameter in a normal mode.

3. A parachute or paraglider deployment device comprising:
the crash detection device described in claim 1,
a parachute or a paraglider that is deployable; and an ejection device that, when an abnormal signal is output by the crash detection device, receives the abnormal signal and ejects the parachute or the paraglider.

4. An airbag device comprising:
an airbag that is inflatable;
the crash detection device described in claim 1; and
a gas generator that, when an abnormal signal is output by the crash detection device, receives the abnormal signal and supplies gas into the airbag.

5. A method of detecting a crash of a flying object, the flying object including a safety device, the method comprising:
a data acquisition step of acquiring from a sensor data of a flying state of the flying object at a sampling frequency of 1 kHz or more;
a detection step of verifying proper operation of the sensor;
a first determination step of determining whether the data acquired in the data acquisition step is equal to or greater than a predetermined threshold value;
a second determination step of determining whether the data is data indicating that the flying state of the flying object is abnormal or noise that is unnecessary data when the data is determined to be equal to or greater than the predetermined threshold value by the first determination step, said second determination step further includes distinguishing noise based on information on a half width or a peak area of a peak of the data acquired by calculating the data acquired from the sensor; and
a step of activating the safety device by the second determination step when the data is determined to be the data indicating that the flying state of the flying object is abnormal.

* * * * *